UNITED STATES PATENT OFFICE.

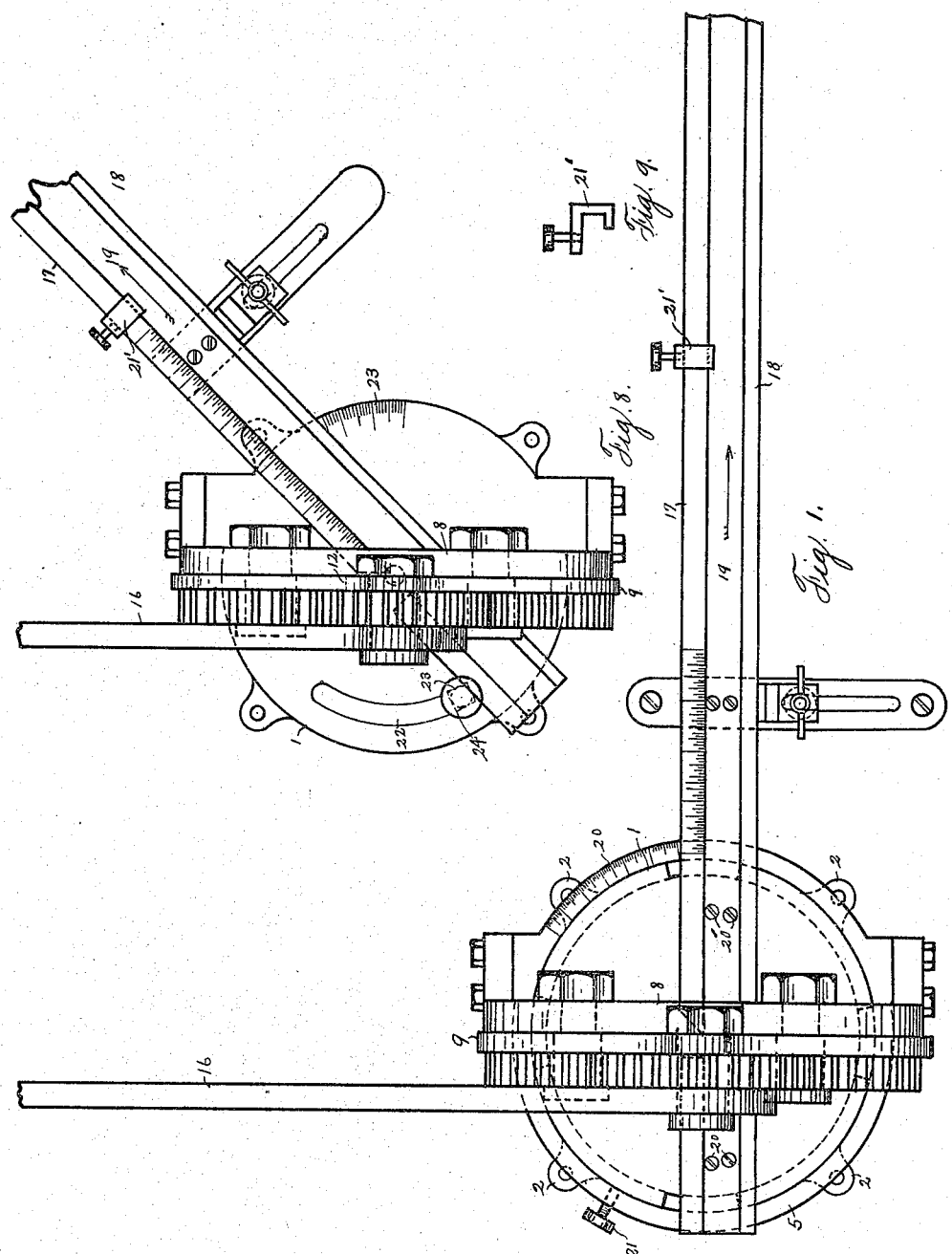

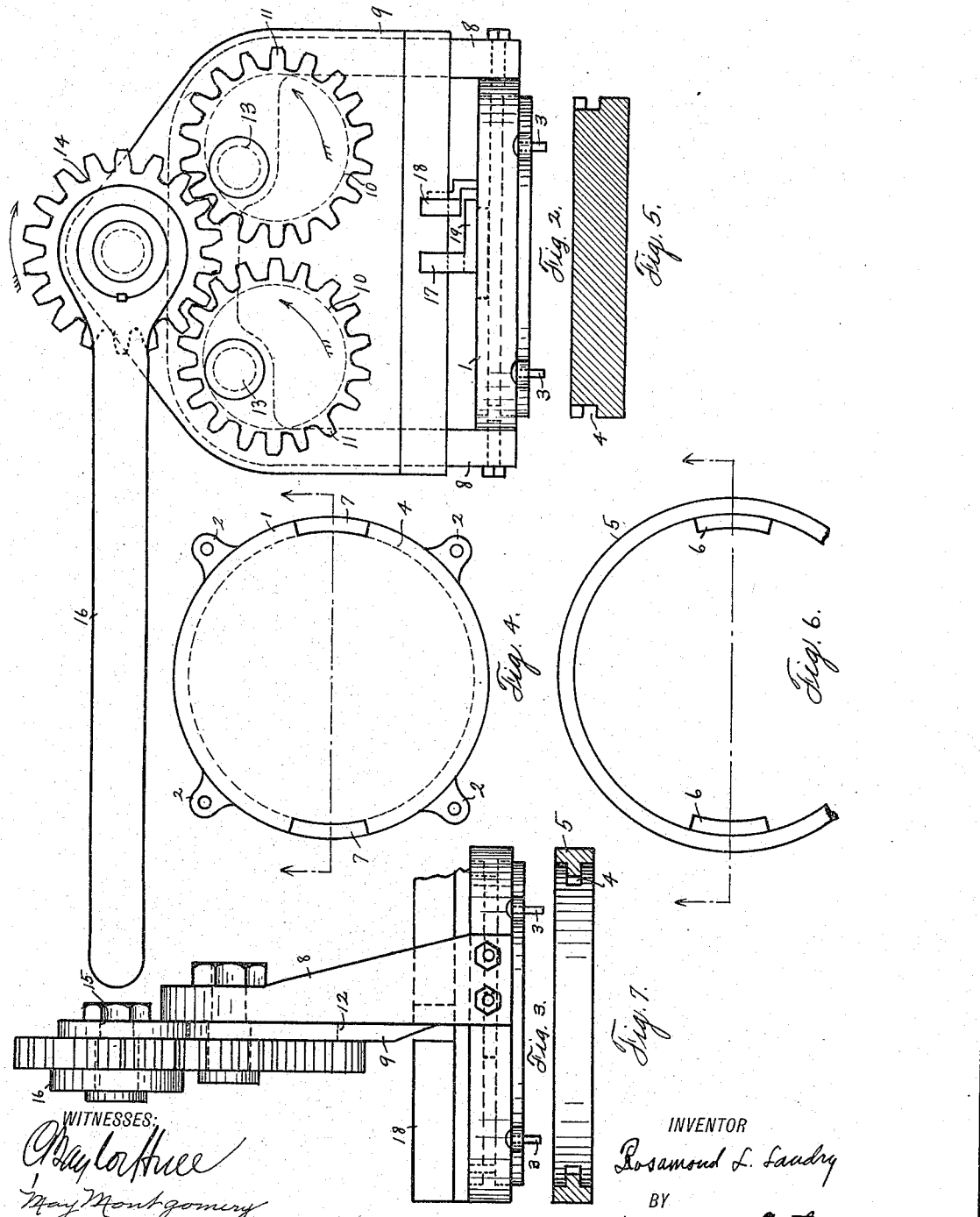

ROSAMOND L. LANDRY, OF HOUSTON HEIGHTS, TEXAS.

PACKING-CUTTER.

1,176,838.      Specification of Letters Patent.      Patented Mar. 28, 1916.

Application filed May 22, 1914. Serial No. 840,251.

*To all whom it may concern:*

Be it known that I, ROSAMOND L. LANDRY, a citizen of the United States, residing at Houston Heights, in the county of Harris and State of Texas, have invented certain new and useful Improvements in Packing-Cutters, of which the following is a specification.

This invention relates to new and useful improvements in a packing cutter.

The object of the invention is to provide a machine for cutting packing, whereby the same may be rapidly and accurately cut into the required lengths with the minimum amount of expense and waste.

It is a well known fact that packing, such as is used for pistons and cylinders is formed of tough material, closely packed or woven together and it is, therefore, very difficult to cut the same and leave the ends smooth and even, so that when the packing is formed into a circle, the ends will meet perfectly.

It is the object of this invention to provide a machine which will cut packing at the desired angle and will give smooth, perfect fitting ends to the same when cut.

With the above and other objects in view, the invention has particular relation to certain novel features of construction, operation and arrangement of parts, an example of which is given in this specification and illustrated in the accompanying drawings, wherein—

Figure 1 is a plan view of the device. Fig. 2 is a side elevation thereof. Fig. 3 is a fragmentary end view thereof. Fig. 4 is a plan view of the supporting base. Fig. 5 is a vertical sectional view thereof. Fig. 6 is a fragmentary plan view of the frame support. Fig. 7 is a vertical sectional view thereof. Fig. 8 is a plan view of a modified form of the device, and Fig. 9 shows a side elevation of a form of gage employed.

Referring now more particularly to the drawings, wherein like numerals of reference designate similar parts in each of the figures, the numeral 1 refers to the base which is a circular member supported by the legs 2, which may be secured to a floor, or platform by means of the bolts 3. This base has a peripheral groove 4 therearound, and a circular rim 5, forming a frame support is provided, having two opposed inwardly projecting lugs 6, 6, which project into said groove and hold the rim in position. Opposing sections of the sides of the base are cut away, forming opposing notches 7, 7. When it is desired to place the rim 5 in position, the lugs 6, 6 may be brought into co-incidence with the notches 7, 7 and passed therethrough and the rim then turned, the lugs 6, 6 engaging in the groove 4, and the said rim 5 may in the same manner be detached from said base.

Secured to the rim 5 is an inverted U-shaped member 8, forming the framework of the device and against one side of this framework is the vertically movable blade 9. This blade is provided with two horizontally alined enlarged bearings 10, 10.

The numerals 11, 11 refer to two spur gear wheels which fit against the outer face of the blade 9 and the inner faces of these spur gear wheels are provided with cams, such as 12, which fit in their corresponding bearings 10, 10. Suitable bolts 13, 13 pass through the respective gear wheels 11 and are secured to the framework 8 and operate to hold said gear wheels closely against the blade 9 and o form bearings on which said gear wheels also form bearings on which said gear wheels rotate. The gear wheels 11, 11 and the cams 12 are concentric, but the bolts 13 are eccentric relative to said gear wheels and cams and are so located that said gear wheels 11, 11 will rotate in a corresponding manner. In vertical alinement with the gear wheels 11, 11 is the gear wheel 14 which operates on the bolt 15 as a bearing, said bolt being secured to the upper edge of the blade 9. The gear wheel 14 is in mesh with each of the gear wheels 11, 11 and may be rotated by the handle 16 with which it is integral. It is obvious that when said handle 16 is elevated and the gear wheel 14 rotated in the direction indicated by the arrow in Fig. 2, a corresponding rotation will be imparted to the gear wheels 11, 11, which will operate through the cams 12 to elevate the blade 9 and when a reverse movement is imparted to the handle 16, a reverse or downward movement will be imparted to the blade 9.

It is further obvious that the cams 12 will impart a swinging, or lateral motion to said blade, as it moves up and down and the sharp edges of the blade will operate with a shearing effect on the packing underneath, as will be hereinafter explained.

A track, or guide is provided, formed of the side members 17 and 18, the former of which, in cross section, is in the form of an angle, thus providing the bottom 19 for the guide. The side 18 is adjustable toward and from the side 17, so that said track or guide may be made wide or narrow, to conform to the width of the packing, which is passed therealong and the bottom and side 17 are fixed to the base 1, by means of suitable screws, such as 20'.

The packing to be cut is manufactured in long strips and then cut into pieces of the desired length, as used. This packing is passed along the guide or track in the direction indicated by the arrow in Fig. 1 and passes under the blade 9. Inasmuch as the rim 5 and the frame-work carried thereby may be rotated relative to the base 1, it is apparent that the blade 9 may be turned to any desired angle, relative to the packing, so that said packing may be cut diagonally, as is usually desirable. The sections of the side members 17 and 18, immediately underneath the blade, are cut away, as shown in Fig. 3, so as to permit the blade 9 to descend against the bottom 19 and entirely separate the packing.

As hereinbefore stated, the rim 5 may be rotated relative to the base 1, so as to bring the blade to any desired angle relative to the packing to be cut and said rim is provided with a gage, as 20, indicating said angle. A set screw 21 is provided, which is threaded through the rim 5 and whose inner end engages against the base 1, by means of which said rim may be locked in a fixed position relative to the base, when the machine is in operation, which will thus insure uniformity in the angle at which the packing is cut.

As shown, the side 17 of the guide is marked so as to indicate the length of the packing being cut and a movable stop 21' is carried by said side and arranged to be adjusted thereon at any point desired, so as to secure uniformity in the lengths of packing.

The modified form shown in Fig. 8 is substantially similar to the form shown in the other figures, but differs in certain features, as will now be explained. In the modified form, the guide is pivoted to the base 1, at its center, so as to be adjustable relative to said base and one side of the base is provided with an arcuate slot 22, through which a stud 23, integral with the guide, extends and the free end of this stud, has a nut 24 threaded thereon. When this nut is tightened the guide is secured in fixed position relative to the base, but it may be loosened and the guide adjusted to the desired point and the nut again tightened and the guide thus firmly held at said point of adjustment. In this form of device the frame 8 is secured directly to the base and the angle at which the packing is cut is determined by the adjustment of said guide rather than by the adjustment of the blade, as in the case of the other form. The base of the modified form is provided with a gage 23, which indicates the angle of adjustment of the guide.

In operation the stop 21' is set at a point on the guide to indicate the length of the desired packing and the packing is then inserted along the guide in the direction indicated by the arrow until its end engages against the stop 21'. The handle 16 is then manipulated so as to force the blade 9 downwardly. As hereinbefore explained, as the blade moves downwardly, it also moves laterally and by reason of this movement easily shears the packing in two. The severed piece of packing is then removed and the packing again moved along in the guide until it engages against the stop 21' and the operation repeated. It is obvious that the packing thus cut will be uniform in length and the ends will be cut at an uniform angle, thus insuring a perfect fit when the packing is formed into rings for a cylinder or piston.

What I claim is:—

1. A device of the character described including a frame, a pair of bearing members carried thereby, an eccentric rotating upon each of said bearing members, a blade in operative connection with said eccentrics, spur gears carried by said eccentrics, a spur gear wheel rotatably mounted upon said blade and in mesh with the gears of said eccentrics, means for rotating said spur gear wheel, whereby rotation is imparted to said eccentrics and a reciprocating motion to said blade.

2. A device of the character described including a base, a frame carried thereby, a blade, a pair of eccentrics operatively connected with the blade, bearing members carried by the frame upon which said eccentrics rotate, a manual mechanism in operative connection with both of said eccentrics and provided to rotate the same and thereby reciprocate the blade, a guide arranged upon said base underneath the blade, said blade and guide being adjustable relative to each other.

3. A device of the character described including a base, a frame carried thereby, a blade, a pair of eccentrics operatively connected with the blade, bearing members carried by the frame upon which said eccentrics rotate, a manual mechanism in operative connection with both of said eccentrics and provided to rotate the same and thereby reciprocate the blade, a guide arranged upon said base underneath the blade, the side members of said guide being adjustable toward and from each other and said blade and guide being adjustable relative to each other.

In testimony whereof I have signed my name to this specification in the presence of two subscribing witnesses.

ROSAMOND L. LANDRY.

Witnesses:
MAY MONTGOMERY,
C. BAYLOR HULL.

Copies of this patent may be obtained for five cents each, by addressing the "Commissioner of Patents, Washington, D. C."